(No Model.) 2 Sheets—Sheet 1.

J. W. CAHILL.
SEEDER AND CULTIVATOR.

No. 465,072. Patented Dec. 15, 1891.

Witnesses
C. M. Gallaher
Wm. Bagger

Inventor
Jno. W. Cahill
By his Attorneys,
C. A. Snow & Co.

(No Model.) 2 Sheets—Sheet 2.

J. W. CAHILL.
SEEDER AND CULTIVATOR.

No. 465,072. Patented Dec. 15, 1891.

Witnesses
E. M. Gallaher
Wm. Bagger

Inventor
Jno. W. Cahill
By his Attorneys,
C. A. Snow & Co.

THE NORRIS PETERS CO., PHOTO-LITHO., WASHINGTON, D. C.

United States Patent Office.

JOHN W. CAHILL, OF LOCHIEL, INDIANA, ASSIGNOR OF ONE-HALF TO JAMES HOLLINGSWORTH, OF SAME PLACE.

SEEDER AND CULTIVATOR.

SPECIFICATION forming part of Letters Patent No. 465,072, dated December 15, 1891.

Application filed March 12, 1891. Serial No. 384,812. (No model.)

*To all whom it may concern:*

Be it known that I, JOHN W. CAHILL, a citizen of the United States, residing at Lochiel, in the county of Benton and State of Indiana, have invented a new and useful Seeder and Cultivator, of which the following is a specification.

This invention relates to a combined agricultural machine adapted to be used as a seed-planter and for cultivating purposes; and it has for its object to provide a combined implement which shall be simple in construction, durable, and inexpensive, and which may be readily converted and adapted to the various purposes for which it is devised.

The invention consists in the improved construction, arrangement, and combination of parts, which will be hereinafter fully described, and particularly pointed out in the claims.

Figure 1:
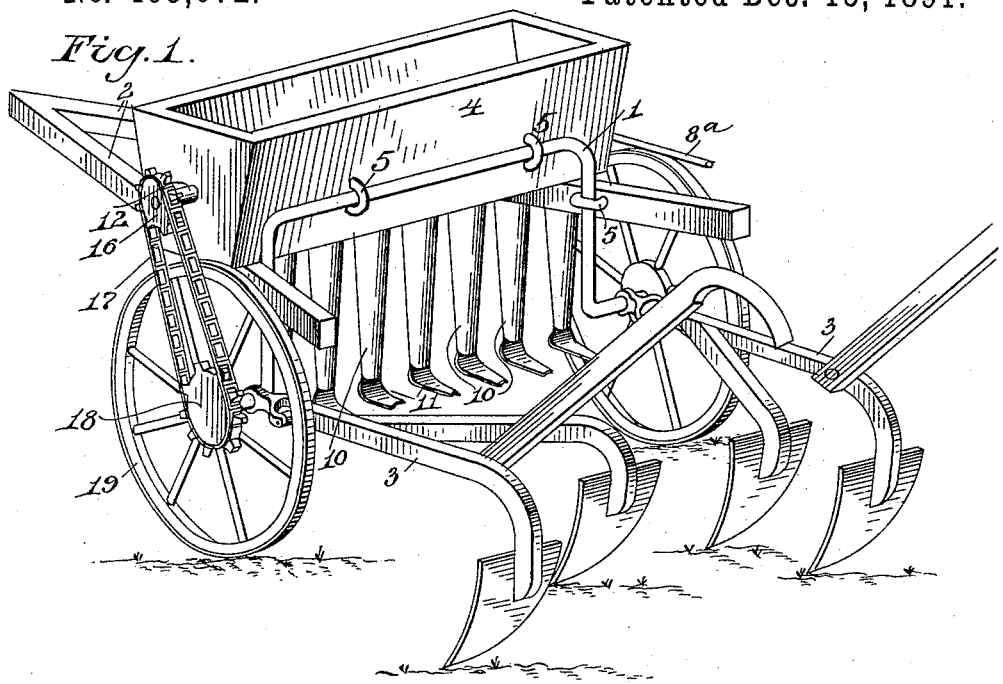
Figure 2:
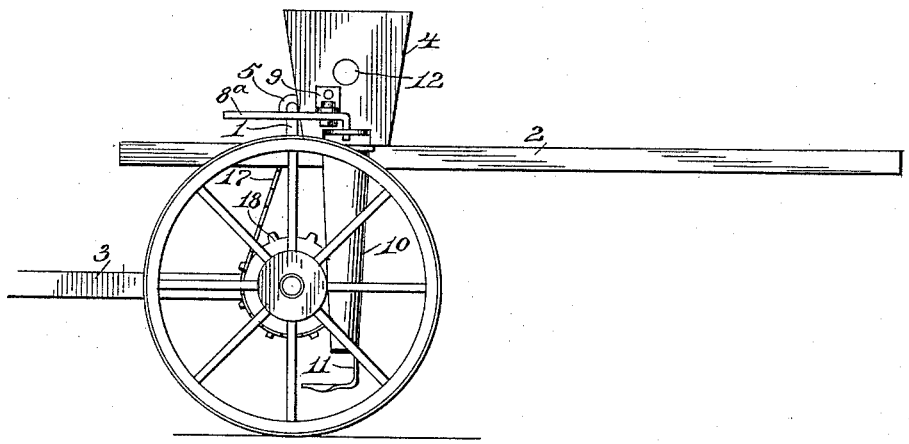
Figure 3:
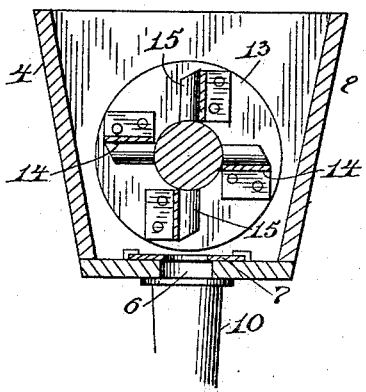
Figure 4:
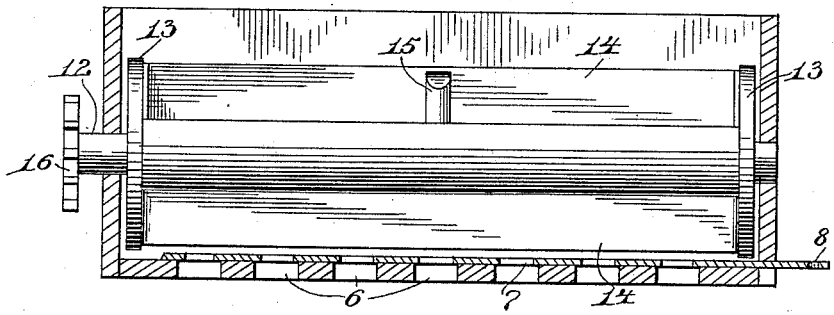
Figure 5:
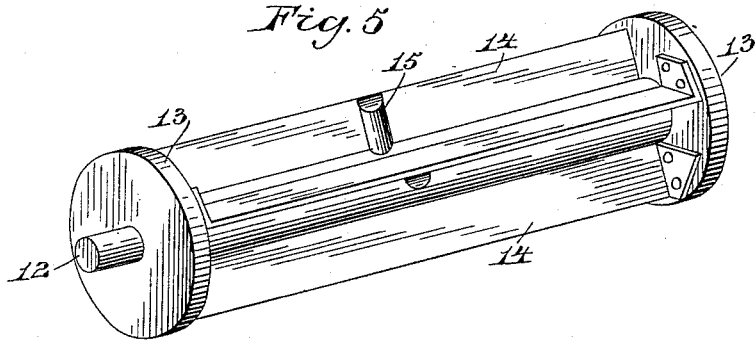

In the drawings hereto annexed, Figure 1 is a perspective view of a combined implement constructed in accordance with my invention. Fig. 2 is a side elevation of the same. Fig. 3 is a longitudinal sectional detail view. Fig. 4 is a transverse sectional view taken through the seed-box or hopper. Fig. 5 is a perspective detail view of the revolving shaft or agitator.

Like numerals of reference indicate like parts in all the figures.

1 designates an ordinary arched cultivator-axle, and 2 2 are the forwardly-converging tongue-bars, which are suitably connected to the same.

The cultivator-beams 3 3 are connected in the usual manner to the axle by means of universal joints or couplings, which will enable them to be adjusted laterally or vertically, as may be desired. These parts are to be of ordinary well-known construction, and no novelty is claimed for the same in the present application, except in so far as they may be adapted to co-operate with the seeder attachment, which I shall now proceed to describe.

4 designates a hopper or seed-box which is supported upon the tongue-bars 2 2 directly in front of the axle 1, to which latter the said tongue-bars may be connected detachably by means of the clips or fastenings 5. The bottom of the seed-box is provided with openings 6 for the passage of the seed, and with a transversely-movable perforated slide 7, one end of which projects through one end of the box and is provided with a perforation 8 to receive the downwardly-turned end of a lever $8^a$, which is pivoted to a suitable bracket 9, and by means of which the said slide may be adjusted so as to regulate the passage of seed. To the under side of the bottom of the seed-box are secured the seed-tubes 10, the lower ends of which have rearwardly-curved shields 11 to receive and to scatter the seed which passes through the tubes 10 from the perforations 6 in the bottom of the seed-box. The sides or ends of the seed-box are provided with bearings for a shaft 12, which is provided with circular disks 13, arranged within the seed-box and adjacent to the ends of the latter. Said disks are connected by means of ribs or flanges 14, which are arranged tangentially to the shaft 12, which latter is provided with arms or spokes 15 to support the said ribs or flanges. One end of the shaft 12, which projects through the end of the seed-box, is provided with a sprocket-wheel 16, which may be connected by a chain 17 with a sprocket-wheel 18 upon one of the transporting-wheels 19, which are journaled upon the spindles of the axle of the cultivator.

The operation of my invention and its advantages will be readily understood from the foregoing description, taken in connection with the drawings hereto annexed. When the seed-box or hopper is detached, the implement may be utilized as an ordinary cultivator. In order to convert the same into a seeder it is only necessary to mount the seed-box or hopper upon the tongue-bars and to secure the latter to the axle by means of the clips 5. When the machine progresses over the field, a rotary motion will be imparted from one of the transporting-wheels 9 to the shaft 12 through sprocket-chain 17, causing the latter to be rotated and the ribs or flanges 14 to agitate the contents of the box and to convey it to the seed opening or passages 6, from which said shaft it will pass through the seed tubes or spouts 10 to the scatterers 11. The cultivators, the beams of which may be provided with blades of suitable construction, will serve to cover the seed, thus preventing it from being washed away by rain or eaten by birds. The quantity of seed which is dropped may be gaged or regulated by means of the seed-slide 7, which may be adjusted so as to partly cover the openings 6. By the peculiar construction and arrangement of the ribs or flanges 14 upon the rotary shaft 12 the contents of the box are constantly disturbed and agitated and are conveyed to the seed openings or passages without danger of choking the latter.

The general construction of the machine is simple and inexpensive, and the seeding attachment may be readily applied to any cultivator of ordinary construction.

Having thus described my invention, what I claim is—

1. The combination, with a cultivator, of a seed-planting attachment comprising a seed-box the bottom of which is provided with perforations and with a transversely-movable perforated slide, a shaft journaled in the ends of said box and provided with disks connected by tangentially-disposed ribs or flanges, and arms or spokes supporting the latter, the downwardly-extending seed-tubes terminating in laterally-bent ends forming the scatterers and operating mechanism, substantially as set forth.

2. The combination, with a cultivator, of a seed-box mounted upon the forwardly-converging tongue-bars and connected detachably with the axle, a rotary shaft or agitator mounted in the said seed-box and provided with a sprocket-wheel at one end, a chain connecting said sprocket-wheel with a sprocket-wheel upon one of the transporting-wheels of the cultivator, the transversely-adjustable seed-slide, and the seed-tubes provided at their lower ends with rearwardly-extending scatterers, substantially as and for the purpose set forth.

In testimony that I claim the foregoing as my own I have hereto affixed my signature in presence of two witnesses.

JOHN W. CAHILL.

Witnesses:
   LEE DINWIDDIE,
   A. D. RAUB.